J. A. STUBBLEFIELD.
LOCK NUT.
APPLICATION FILED MAR. 4, 1918.
1,325,125.
Patented Dec. 16, 1919.
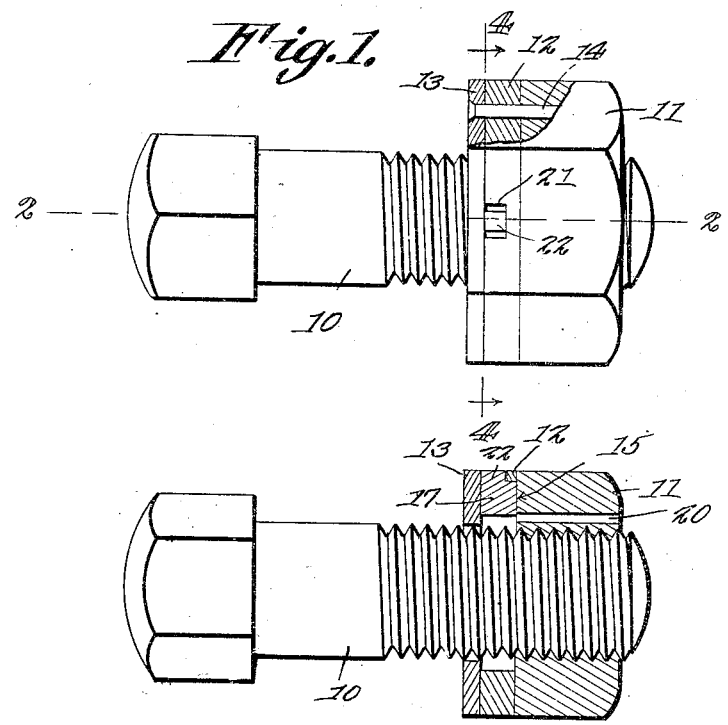
Fig. 1.
Fig. 2.
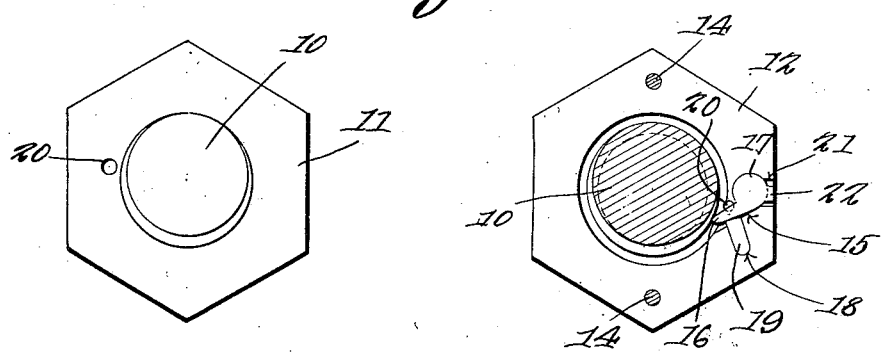
Fig. 3.
Fig. 4.
Inventor
J. A. Stubblefield
By C. A. Snow & Co.
Witness

UNITED STATES PATENT OFFICE.

JOHN A. STUBBLEFIELD, OF PORTLAND, OREGON.

LOCK-NUT.

1,325,125.          Specification of Letters Patent.     Patented Dec. 16, 1919.

Application filed March 4, 1918. Serial No. 220,260.

*To all whom it may concern:*

Be it known that I, JOHN A. STUBBLEFIELD, a citizen of the United States, residing at Portland, in the county of Multnomah and State of Oregon, have invented a new and useful Lock-Nut, of which the following is a specification.

The subject of the present invention is a nut lock, and the invention contemplates the provision of a nut having positive locking means.

A further object within the contemplation of the invention is the provision of means for unlocking the nut when it is desired to remove the same from the bolt.

It is also within the objects of the invention to provide means for protecting the lock from injury due to atmospheric conditions or to accumulations of dirt in the lock.

A further object within the contemplation of the invention is the production of a simple, durable and efficient lock nut.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical embodiment of the invention is illustrated in the accompanying drawing, wherein:—

Figure 1 is a view in side elevation of a bolt and nut constructed in accordance with the invention, a portion of the nut being broken away;

Fig. 2 is a section on the line 2—2 of Fig. 1, the bolt being in elevation;

Fig. 3 is a view in end elevation;

Fig. 4 is a section on the line 4—4 of Fig. 1.

Referring to the drawings by numerals of reference:—

In carrying out the invention there is provided the usual and ordinary bolt 10 upon which is threaded the nut constructed in accordance with the invention.

The nut comprises three main parts of which the main body portion is indicated at 11; the dog or pawl carrying member at 12; and the closure plate or protector at 13. These parts may be firmly joined together by spot-welding or in any other suitable manner, but are herein shown as apertured or bored to receive dowel pins 14 by which they may be firmly attached.

The member 12 is slotted or grooved transversely of its inner periphery, as at 15, to form a recess for the reception of a dog 16 the edge of which is adapted to engage the threads of the bolt 10 and lock the nut against rotation in one direction with respect to the bolt. The groove is formed to receive the substantially cylindrical head 17 of the dog so that the dog may be free to rock or pivot thereon. A branch groove 18 is formed to extend from the groove 15 and in this groove a resilient element 19, herein shown as a rubber block, is positioned to press upon the dog 16 and force its edge against the bolt 10.

A bore 20 extends longitudinally through the nut from its head and communicates with the recess formed by the groove 15 so that a wire or other slender instrument may be inserted in the bore and contact the dog 16 to move the same from engagement with the threads of the bolt 10.

A slot 21 may also be formed in the member 12 and communicate with the groove 15 and through this slot projects a lug 22 formed on the head 17 of the dog. By inserting a pointed instrument into the slot 21 to contact the lug 22 the dog may be moved from contact with the threads of the bolt to release the nut for rotation in either direction with respect to the bolt.

It is, of course, to be understood that either the slot 21 or the bore 20 may be omitted if so desired. Likewise the lug 22, on the head of pawl 17, may be eliminated or used as the occasion may warrant.

While the nut is herein shown as supplied with but one dog 16, it is to be understood that a number of similar dogs may be spaced circumferentially of the bore of the nut should occasion require.

Having thus described the invention, what is claimed as new and sought by Letters Patent, is:—

In combination with the threaded end of a bolt, a nut engaging the threads of the bolt, a disk having a curved recess formed in one of the side faces thereof, a pawl having a curved portion fitted in the curved portion of the recess to provide a pivot, said recess having a lateral opening, a lug formed on the pawl and extending through the opening, the opening being of a length greater than the width of the lug to permit movement of the lug within the opening, said pawl contacting with the threads of the bolt and a protector plate secured to the disk, said protector plate having a central opening contacting with the threads of the bolt, for closing one side of the disk.

In testimony that I claim the foregoing as my own I have hereto affixed my signature in the presence of two witnesses.

JOHN A. STUBBLEFIELD.

Witnesses:
A. J. CHRISTOPHERSON,
MARGUERITE COOPER.